United States Patent
Deschenes et al.

[11] Patent Number: 6,067,016
[45] Date of Patent: May 23, 2000

[54] EAS MARKER AND METHOD OF MANUFACTURING SAME

[75] Inventors: Charles L. Deschenes, North Attleboro, Mass.; Charles K. Herrmann, Cleveland Heights, Ohio

[73] Assignee: Avery Dennison Corporation, Pasadena, Calif.

[21] Appl. No.: 08/976,878

[22] Filed: Nov. 24, 1997

Related U.S. Application Data

[63] Continuation-in-part of application No. 08/925,117, Sep. 8, 1997, Pat. No. 5,949,336, which is a continuation-in-part of application No. 08/867,348, Jun. 2, 1997.

[51] Int. Cl.$^7$ ................................................ G08B 13/14
[52] U.S. Cl. ..................................... 340/572.8; 340/572.6
[58] Field of Search ........................... 340/572.8, 572.6, 340/572.5, 572.1

[56] References Cited

U.S. PATENT DOCUMENTS

| | | |
|---|---|---|
| 3,515,778 | 6/1970 | Fields et al. . |
| 3,594,863 | 7/1971 | Erb . |
| 3,932,248 | 1/1976 | Keaton . |
| 3,974,581 | 8/1976 | Martens et al. ................ 340/572.8 X |
| 4,329,196 | 5/1982 | Rawlinson . |
| 4,386,043 | 5/1983 | Takeshima . |
| 4,456,123 | 6/1984 | Russell . |
| 4,462,784 | 7/1984 | Russell . |
| 4,510,489 | 4/1985 | Anderson, III et al. . |
| 4,510,490 | 4/1985 | Anderson, III et al. . |
| 4,563,323 | 1/1986 | Breher . |
| 4,622,543 | 11/1986 | Anderson, III et al. . |
| 4,682,154 | 7/1987 | Fearon et al. . |
| 4,686,154 | 8/1987 | Mejia . |
| 4,717,438 | 1/1988 | Benge et al. . |
| 4,727,360 | 2/1988 | Ferguson et al. ............... 340/572.8 X |
| 4,727,668 | 3/1988 | Anderson et al. . |
| 4,774,504 | 9/1988 | Hartings ............................ 340/572.5 |
| 4,882,569 | 11/1989 | Dey . |
| 4,968,972 | 11/1990 | Canipe ............................ 340/572.3 X |
| 5,049,232 | 9/1991 | Tola . |
| 5,282,915 | 2/1994 | Westlake, Jr. . |
| 5,351,033 | 9/1994 | Liu et al. . |
| 5,355,120 | 10/1994 | Ferguson et al. . |

(List continued on next page.)

FOREIGN PATENT DOCUMENTS

81 23710   6/1963   France .

*Primary Examiner*—Thomas Mullen
*Attorney, Agent, or Firm*—Kriegsman & Kriegsman

[57] ABSTRACT

An EAS marker and method of manufacturing same. In a preferred embodiment, the EAS marker comprises a rigid bottom piece of molded plastic having the shape of an open rectangular box. An elongated resonator is disposed in the bottom piece, the resonator being bowed downwardly about its longitudinal axis. A rigid separator of molded plastic is positioned over the open top of the bottom piece, thereby loosely encasing the resonator in the bottom piece. The foregoing bottom piece, resonator and separator are all positioned within the cavity of a rigid top piece of molded plastic having the shape of an inverted open rectangular box, the separator being press-fit against the interior surface of the top wall of the top piece, the bottom piece being press-fit against the interior surfaces of the side walls and end walls of the top piece. The top wall of the top piece is provided with a recessed area in which a biasing element is disposed, the biasing element being retained in the recessed area by the separator. The separator is shaped to include a projection that extends downwardly beyond the remainder of the bottom surface of the separator, the projection being sized and shaped to contact the top of the resonator only within a circular area approximately 0.1 inch in diameter located in approximately the middle of the resonator. The present invention is also directed to an automated method and apparatus for manufacturing the above EAS marker. In a preferred embodiment, each of the top piece, the bottom piece and the separator is manufactured, by rotary extrusion molding, as part of a continuous web, and the various continuous webs are automatically laminated to one another at nips between pairs of rollers.

45 Claims, 5 Drawing Sheets

U.S. PATENT DOCUMENTS

| | | |
|---|---|---|
| 5,357,240 | 10/1994 | Sanford et al. . |
| 5,414,412 | 5/1995 | Lian . |
| 5,441,687 | 8/1995 | Murasaki et al. . |
| 5,469,140 | 11/1995 | Liu et al. . |
| 5,494,550 | 2/1996 | Benge . |
| 5,495,230 | 2/1996 | Lian . |
| 5,499,015 | 3/1996 | Winkler et al. . |
| 5,512,234 | 4/1996 | Takizawa et al. . |
| 5,565,849 | 10/1996 | Ho et al. . |
| 5,568,125 | 10/1996 | Liu . |
| 5,628,840 | 5/1997 | Hasegawa . |
| 5,650,023 | 7/1997 | Hasegawa et al. . |
| 5,676,767 | 10/1997 | Liu et al. . |

EAS MARKER AND METHOD OF MANUFACTURING SAME

CROSS-REFERENCE TO RELATED APPLICATIONS

The present application is a continuation-in-part of U.S. patent application Ser. No. 08/925,117, filed Sep. 8, 1997, now U.S. Pat. No. 5,949,336, which in turn is a continuation-in-part of U.S. patent application Ser. No. 08/867,348, filed Jun. 2, 1997, both of which are incorporated herein by reference.

BACKGROUND OF THE INVENTION

The present invention relates generally to electronic article surveillance (EAS) systems and more particularly to a novel EAS marker for use in an EAS system and to a method of manufacturing said EAS marker.

The problem of protecting articles of merchandise and the like against theft has been the subject of numerous technical approaches. One such type of approach has been to attach to the article an electronic tag or marker that is adapted to trigger an alarm or the like if the article of merchandise is moved beyond a predetermined location and the electronic marker has not been deactivated or removed from the article of merchandise. In the aforementioned type of approach, a transmitting apparatus and a receiving apparatus are typically situated on opposite sides of a passageway leading to an exit of the premises being protected, the transmitting apparatus and the receiving apparatus together defining an interrogation zone. The transmitting apparatus is typically used to transmit over the interrogation zone an interrogation signal that is recognizable by the EAS marker and that causes the EAS marker, if activated, to emit a response signal. The receiving apparatus is typically used to detect the presence of a response signal from an activated EAS marker located within the interrogation zone. The detection by the receiving apparatus of a response signal indicates that the EAS marker has not been removed or deactivated and that the article bearing the marker may not have been paid for or properly checked out. Typically, the detection of such a response signal by the receiving apparatus triggers an alarm.

Several different types of EAS markers have been disclosed in the literature and are in use. In one type of EAS marker, the functional portion of the marker consists of either an antenna and diode or an antenna and capacitors forming a resonant circuit. When placed in an electromagnetic interrogation zone created by the transmitting apparatus, the antenna-diode marker generates harmonics of the interrogation frequency in a receiving antenna in the receiving apparatus; the resonant circuit marker causes an increase in absorption of the transmitted signal so as to reduce the signal in the receiving apparatus. The detection of the harmonic or signal level change indicates the presence of the marker in the interrogation zone. With this type of system, the marker is not amenable to deactivation and, therefore, must be removed from the article of merchandise at the time of purchase so as not to trigger the alarm when the merchandise is removed from the store.

Another type of EAS marker includes a magnetostrictive element, also referred to in the art as "a resonator." Typically, the resonator is in the form of a ribbon-shaped length of an amorphous magnetostrictive ferromagnetic material. Said type of EAS marker also typically includes a biasing magnetic element. The resonator is fabricated such that it is mechanically resonant at a predetermined frequency when the biasing element has been magnetized to a certain level and the resonator is brought into an interrogation zone consisting of an AC magnetic field of the predetermined frequency. In use, the biasing element is activated, i.e., magnetized, and the marker is brought into the interrogation zone, thereby causing the resonator to mechanically resonate at the predetermined frequency. This resonant signal radiated by the resonator is then detected by circuitry provided in the receiving apparatus. By demagnetizing the biasing element, the bias is removed from the resonator; accordingly, when subjected to the AC magnetic field, the resonator no longer resonates to produce a detectable magnetic field. The marker can thus be activated and deactivated by magnetizing and demagnetizing the biasing element.

Examples of the aforementioned magnetomechanical type of EAS marker are disclosed in the following U.S. patents, all of which are incorporated herein by reference: U.S. Pat. No. 4,510,489, inventors Anderson, III et al., which issued Apr. 9, 1985; U.S. Pat. No. 4,510,490, inventors Anderson, III et al., which issued Apr. 9, 1985; U.S. Pat. No. 4,622,543, inventors Anderson, III et al., which issued Nov. 11, 1986; U.S. Pat. No. 5,351,033, inventors Liu et al., which issued Sep. 27, 1994; U.S. Pat. No. 5,469,140, inventors Liu et al., which issued Nov. 21, 1995; U.S. Pat. No. 5,495,230, inventor Lian, which issued Feb. 27, 1996; U.S. Pat. No. 5,568,125, inventor Liu, which issued Oct. 22, 1996; and U.S. Pat. No. 5,676,767, inventors Liu et al., which issued Oct. 14, 1997.

U.S. Pat. No. 4,510,489, which is illustrative of the aforementioned magnetomechanical type of EAS marker, discloses an elongated ductile strip of magnetostrictive, ferromagnetic material adapted, when armed, to resonate mechanically at a frequency within the range of an incident magnetic field. Suitable amorphous ferromagnetic metals, or metallic glasses, are disclosed for example in U.S. Pat. No. 4,553,136. Exemplary materials include the METGLAS alloys. Said strip is disposed adjacent to a ferromagnetic element, such as a biasing magnet capable of applying a dc field to the strip. The biasing magnet has a configuration and disposition adapted to provide the strip with a single pair of magnetic poles, each of the poles being at opposite extremes of the long dimension of the strip. The composite assembly is placed within the hollow recess of a rigid container composed of polymeric material such as polyethylene or the like, to protect the assembly against mechanical damping. The biasing magnet is typically a flat strip of high coercivity material such as SAE 1095 steel, Vicalloy, Remalloy or Arnokrome. Said biasing magnet is held in the assembly in a parallel, adjacent plane, such that the high coercivity material does not cause mechanical interference with the vibration of the strip. Generally, said biasing magnet acts as one surface of the package. Alternatively, two pieces of high magnetic coercivity material may be placed at either end of the strip, with their magnetic poles so arranged as to induce a single pole-pair therein. Alternatively, the bias field can be supplied by an external field coil pair disposed remotely from the marker in the exit passageway.

A magnetomechanical EAS marker that is integrated with an article of merchandise is disclosed in U.S. Pat. No. 5,499,015, inventors Winkler et al., which issued Mar. 12, 1996, and which is incorporated herein by reference. According to the aforementioned patent, the article of merchandise is provided with a structural member having an integrally formed cavity. A magnetostrictive element is housed within the cavity, the cavity being sized and shaped to house the magnetostrictive element without constraining the mechanical resonance of the magnetostrictive element. The cavity is closed by a sealing member affixed on the outer surface of the wall in a position such that the sealing member overlies the opening of the cavity. A biasing element is mounted on the outer surface of the sealing member, the biasing element being magnetically biased to cause the magnetostrictive element to be mechanically resonant when exposed to an alternating electromagnetic field generated at a selected frequency by the EAS system. According to an alternative embodiment, the biasing element may be formed as a layer of magnetic ink printed on the outer surface of the sealing member.

A self-biasing magnetostrictive element for a magnetomechanical EAS system is disclosed in U.S. Pat. No. 5,565,849, inventors Ho et al., which issued Oct. 15, 1996, and which is incorporated herein by reference. According to the aforementioned patent, the self-biasing magnetostrictive element is formed by first annealing a ribbon of ferromagnetic material in the presence of a magnetic field applied in a transverse direction relative to the longitudinal axis of the ribbon, and then annealing the ribbon a second time in the presence of a magnetic field applied in the direction of the longitudinal axis. The twice-annealed ribbon exhibits remanent magnetization along the longitudinal axis and has plural magnetic domains situated along the longitudinal axis. Said self-biasing magnetostrictive ferromagnetic element may be contained within a cavity of a plastic housing to form an EAS marker.

In U.S. Pat. No. 5,494,550, inventor Benge, which issued Feb. 27, 1996, and which is incorporated herein by reference, there is disclosed an EAS tag and a method of making the same. The method of the aforementioned patent comprises providing a continuous web of electrically insulative material, applying to opposed surfaces of the electrically insulative material web a succession of first and second electrically conductive coils and applying to the succession of first electrically conductive coils a normally electrically insulative deactivation structure extending across the first coil succession and convertible to be electrically conductive, the improvement comprising the step of providing an electrostatic charge drain in electrically conductive relation with each of the first electrically conductive coils substantially throughout the manufacture of the tags. The new step may be practiced by providing an electrically grounded, elongate, electrically conductive member across the succession of first electrically conductive coils in electrical continuity therewith.

In U.S. Pat. No. 5,357,240, inventors Sanford et al., which issued Oct. 18, 1994, and which is incorporated herein by reference, there is disclosed an EAS tag with a mechanically vibrating magnetic element and an improved housing and a method of making the same. The EAS tag of the aforementioned patent comprises a tag body having a central region, side wall regions connected to and integral with the central region and flap regions connected to and integral with the side wall regions. The tag body has fold lines at the junctions of the central and side wall regions and at the junctions of the side wall regions and the flap regions. By folding the tag body along these fold lines and, in the course of the folding procedure, inserting a first magnetic element, a substantially closed box-like housing with the first magnetic element loosely housed therein is formed.

Still another type of magnetomechanical EAS marker, which type is also one of the most widely used types of magnetomechanical EAS markers, comprises a plastic sheet material (e.g., styrene) which carries a heat seal coating. Said plastic sheet material is subjected to a thermoforming process to form a rectangular box-like housing with an open top bordered by a surrounding flange. A resonator is inserted into the housing through the open top, the resonator being curved slightly downwardly about its longitudinal axis. A clear, flexible, plastic sheet (e.g., polyethylene), often referred to as "lidstock," is placed over the top of the housing and is heat-sealed or laminated to the border flange so as to close the housing, thereby encasing the resonator therewithin. Due to the aforementioned process of laminating the lidstock to the housing, a downward curve or "pillow" is typically formed in the midsection of the lidstock, said pillow delimiting upward movement of the resonator within the housing. A double-sided adhesively-coated carrier sheet is laid down over the lidstock and is secured to the border flange of the housing. A biasing magnetic element is secured to the underside of the carrier sheet. A peelable liner is applied to the top surface of the carrier sheet. When using the marker, the liner is peeled from the carrier and the exposed adhesive surface thereof is pressed against a desired article of merchandise, thereby securing the article and the marker together. Typically, the marker is manufactured as part of a batch using a multi-stationed, turntable-containing apparatus analogous to that described in U.S. Pat. No. 5,357,240. A commercial embodiment of the aforementioned marker is sold by Sensormatic Electronics Corporation (Deerfield Beach, Fla.) under the "UltraMax" trademark.

Although the aforementioned type of marker has been successful, the marker does possess some limitations. For example, as pointed out in U.S. Pat. No. 5,357,240, the flange of the housing, although needed for mounting the lidstock, increases the size of the housing, and for many applications, is aesthetically unattractive. Consequently, this prevents use of the marker with certain types of articles, and hence, in certain markets. In addition, the procedures carried out in fabricating the marker can result in the undesired bonding of the resonator between the lidstock and the marker housing. If this occurs, the required mechanical vibration of the resonator may be restricted and the resulting marker may not perform acceptably. Furthermore, the heat seal coating on the housing flange remains soft even after the marker manufacture has been completed. As a result, during shipment of the marker, the resonator may become attached to or lodged against the heat seal coating of the housing or may become stuck between the lidstock and the housing, thereby impeding the desired resonance of the resonator. Moreover, even if the resonator does not become lodged between the lidstock and the flange during manufacture or shipment of the marker, the mechanical vibrations of the resonator during use and/or the magnetic attraction between the resonator and the biasing element may cause the resonator to become lodged between the lidstock and the flange, thereby impairing performance.

Still another limitation of the aforementioned marker is that the marker is not highly resistant to being crushed by downward pressure applied from the top of the marker. Still yet another limitation associated with the aforementioned marker is that the above-described batch-wise technique for manufacturing the marker is not optimal in terms of throughput.

SUMMARY OF THE INVENTION

It is an object of the present invention to provide a novel EAS marker for use in an EAS system.

It is another object of the present invention to provide an EAS marker as described above that overcomes at least some of the shortcomings associated with existing EAS markers.

It is yet another object of the present invention to provide an EAS marker as described above that can be mass produced at a high rate of throughput.

According to one aspect of the present invention, there is described an EAS marker comprising a first trough-shaped member and a second trough-shaped member, said second trough-shaped member being joined to said first trough-shaped member to form a closed housing defining a cavity.

According to another aspect of the present invention, there is described an EAS marker comprising (a) a housing, said housing comprising a first piece and a second piece matingly secured to one another and defining a cavity therebetween, (b) a resonator disposed within said housing and (c) a biasing element disposed within said housing.

According to yet another aspect of the present invention, there is described an EAS marker comprising (a) a generally rectangular, closed housing made of a rigid material, said generally rectangular, closed housing having a cavity, (b) a resonator disposed within said cavity and (c) a biasing element disposed within said cavity.

According to still another aspect of the present invention, there is described an EAS marker comprising (a) a resonator container, said resonator container having a cavity and an open top, (b) a resonator disposed within said cavity of said resonator container, (c) a separator positioned over said open top of said resonator container, (d) a biasing element disposed on top of said separator for arming said resonator, and (e) a cover, said cover having a chamber and open bottom, said resonator container, said separator and said biasing element being disposed within said chamber and secured to said cover.

According to still yet another aspect of the present invention, there is described an EAS marker comprising (a) a housing, said housing having a cavity, (b) a resonator disposed within said cavity, (c) a biasing element disposed within said cavity for arming said resonator, and (d) a separator positioned within said cavity between said resonator and said biasing element for physically separating said resonator and said biasing element, said separator being made of a rigid material.

According to a further aspect of the present invention, there is described an EAS marker comprising a separator, said separator having a non-uniform cross-sectional thickness.

According to still a further aspect of the present invention, there is described an EAS marker comprising a separator made of a rigid material and being shaped to define at least one downwardly-extending projection.

According to still yet a further aspect of the present invention, there is described an EAS marker comprising (a) a housing, said housing comprising a top wall, said top wall having a recessed area and (b) a biasing element, said biasing element being positioned within said recessed area.

In a preferred embodiment, the EAS marker of the present invention comprises a top piece, the top piece being a generally rectangular, trough-shaped member having a top wall, a pair of side walls, a pair of end walls and an open bottom. Said top piece is made of a rigid, molded plastic, which may be polypropylene. The top wall of said top piece is provided with a recessed area, said recessed area having dimensions complementary to that of a biasing magnet of the type used in EAS markers.

Said EAS marker of the foregoing preferred embodiment also comprises a biasing magnet of the aforementioned type, said biasing magnet being disposed within said recessed area and being retained therein by a separator. Said separator, which is also made of a rigid, molded plastic, is a generally rectangular member having a flat top surface, a non-uniform cross-section thickness, and a bottom surface shaped to include a projection extending downwardly relative to the remainder of said bottom surface. The distance between the top surface of said separator and the bottom of said projection is approximately 0.010 inch. The top surface of said separator is press-fit against the interior surface of the top wall of said top piece.

Said EAS marker of the foregoing preferred embodiment further comprises a bottom piece, said bottom piece being a generally rectangular, trough-shaped member having a bottom wall, a pair of side walls, a pair of end walls and an open top. Said bottom piece is made of a rigid, molded plastic, which may be polypropylene. Said bottom piece is press-fit within said top piece and against said separator, with the side walls and end walls of bottom piece engaging the corresponding side walls and end walls of said top piece. In this manner, said separator and said bottom piece together define a resonator cavity.

Said EAS marker of the foregoing preferred embodiment additionally comprises a resonator, said resonator being loosely encased within the resonator cavity and being bowed slightly downwardly about its longitudinal axis. Said resonator has a non-vibration node of approximately 0.1 inch located at or about its midportion. Said projection of said separator is aligned with said non-vibration node and is dimensioned to contact said resonator only within said non-vibration node.

According to still yet another aspect of the present invention, there is described a method of manufacturing a container for use in an EAS marker, said method comprising the step of continuously molding a web of plastic material, said web being shaped to include at least one container adapted to hold an EAS component.

According to even still yet another aspect of the present invention, there is described a method of manufacturing an EAS marker, said method comprising the steps of (a) continuously molding a container, said container having a cavity and an opening for permitting access to said cavity, and (b) inserting through said opening and into said cavity of said continuously molded container means for emitting a response signal in response to an interrogation signal transmitted by an EAS system.

According to still a further aspect of the present invention, there is described a method of manufacturing a magnetostrictive EAS marker, said method comprising the steps of (a) providing a resonator container, said resonator container having a resonator cavity and an open top, (b) inserting a resonator into said resonator cavity through said open top, (c) providing a biasing element container, said biasing element container having a biasing element cavity and an open bottom, (d) inverting said biasing element container, (e) inserting a biasing element into said biasing element cavity of said inverted biasing element container, (f) encasing said biasing element within said biasing element container with a separator, (g) inverting said biasing element container to its original orientation, and (h) joining said resonator container and said biasing element container to form a magnetostrictive EAS marker comprising a resonator and a biasing element wherein said resonator and said biasing element are separated by said separator.

According to still yet a further aspect of the present invention, there is described a method of manufacturing a magnetostrictive EAS marker, said method comprising the steps of (a) continuously molding a first web, said first web comprising a plurality of resonator containers, each of said resonator containers having a resonator cavity and an open top, (b) inserting a resonator into through the open top and into the resonator cavity of a first resonator container on said first web, whereby a first marker subassembly is formed, (c) continuously molding a second web, said second web comprising a plurality of biasing element containers, each of said biasing element containers having a biasing element cavity and an open bottom, (d) inverting said second web, (e) inserting a biasing element into the biasing element cavity of a first biasing element container on said inverted second web, (f) continuously molding a third web, said third web comprising a plurality of separator elements, (g) joining a separator element on said third web to a biasing element container on said second web in such a way as to encase said biasing element within said biasing element container, whereby a second marker subassembly is formed, and (h) joining said first marker subassembly to said second marker subassembly to form a magnetostrictive EAS marker comprising a resonator and a biasing element wherein said resonator and said biasing element are separated by said separator element.

According to even still yet a further aspect of the present invention, there is described a method of forming a laminate structure, said method comprising the steps of (a) providing a first web, said first web comprising a plurality of first elements, (b) providing a second web, said second web comprising a plurality of second elements, said second elements being alienable with said plurality of first elements, and (c) passing said first web and said second web through a lamination nip to join said first elements and second elements.

One aspect of the invention relates to the creation of multiple "master rolls" of components of an electronic article surveillance device, or marker; and the assembly of these components through roll lamination techniques. Each of the "master rolls" consists of a web of plastic material, which carries a series of components of the device to be assembled. The web may be continuous or discontinuous.

The components can be periodically or aperiodically spaced on the web, and the components mounted in a given master roll can be the same as each other, or different from each other. In a preferred embodiment, the components are formed in an orthogonal matrix with multiple components arrayed across the width of the web. Preferably, in a given master roll, the components are formed or molded of the same material as the web, but it is also possible to mount or insert components into the web comprising a different material than that used to form the web. In effect, the web serves as a carrier for the components.

A wide variety of molding or forming techniques can be used to create the master rolls of plastic material. Exemplary techniques include continuous molding, injection molding, and thermoforming. Thermoforming is commonly used to form sheets of plastic material into trays, tubs, and the like. The sheet is heated to the proper forming temperature; then, a vacuum draws the sheet down directly onto a male mold or into a female mold. Pressing the sheet between male and female molds is another thermoforming technique.

Preferably, the process for forming the master rolls is continuous molding. A variety of continuous molding processes are known for continuously extruding molten plastic into a molding member. The molding of a master roll as described above is particularly well suited to continuous molding. The type of continuous molding used in a preferred embodiment utilizes a cooled molding wheel.

The manufacturing process of the present invention combines multiple components through lamination at a lamination nip (or at a series of nips). Typically, but not necessarily, the nip is defined by two rollers—roll lamination. Components may be combined at the nip using a variety of techniques, including e.g. press fitting, adhesive lamination, heat bonding and the like. As used in the present specification and claims, "lamination" and "laminate" encompass any of the wide variety of such techniques, and these terms are not limited to particular techniques such as adhesive lamination.

Roll lamination is an efficient and flexible process which may be combined with other assembly processes for in-line production of EAS markers of the present invention. This combination of roll lamination with other assembly processes is exemplified by the manufacturing process detailed below.

Additional objects, features, aspects and advantages of the present invention will be set forth, in part, in the description which follows and, in part, will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
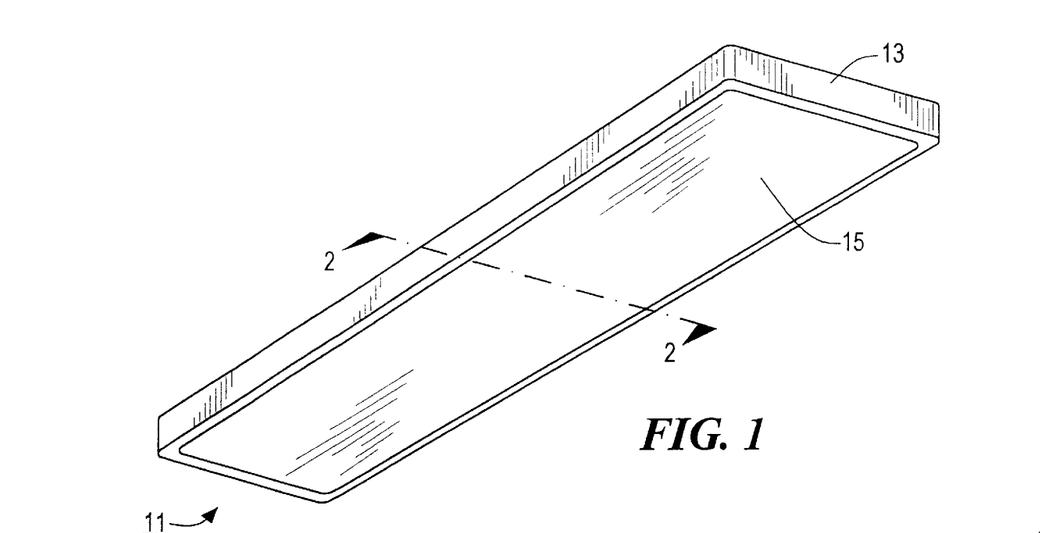
FIG. 1 is a bottom front perspective view of a first embodiment of an EAS marker constructed according to the teachings of the present invention.
Figure 2:
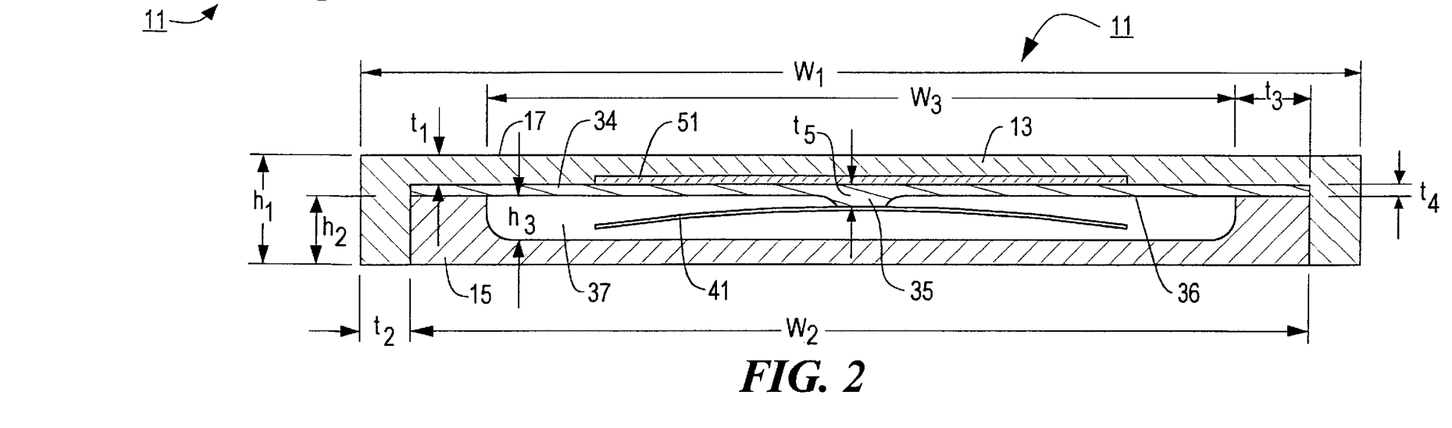
FIG. 2 is a section view of the EAS marker of FIG. 1 taken along line 2—2.
Figure 3:
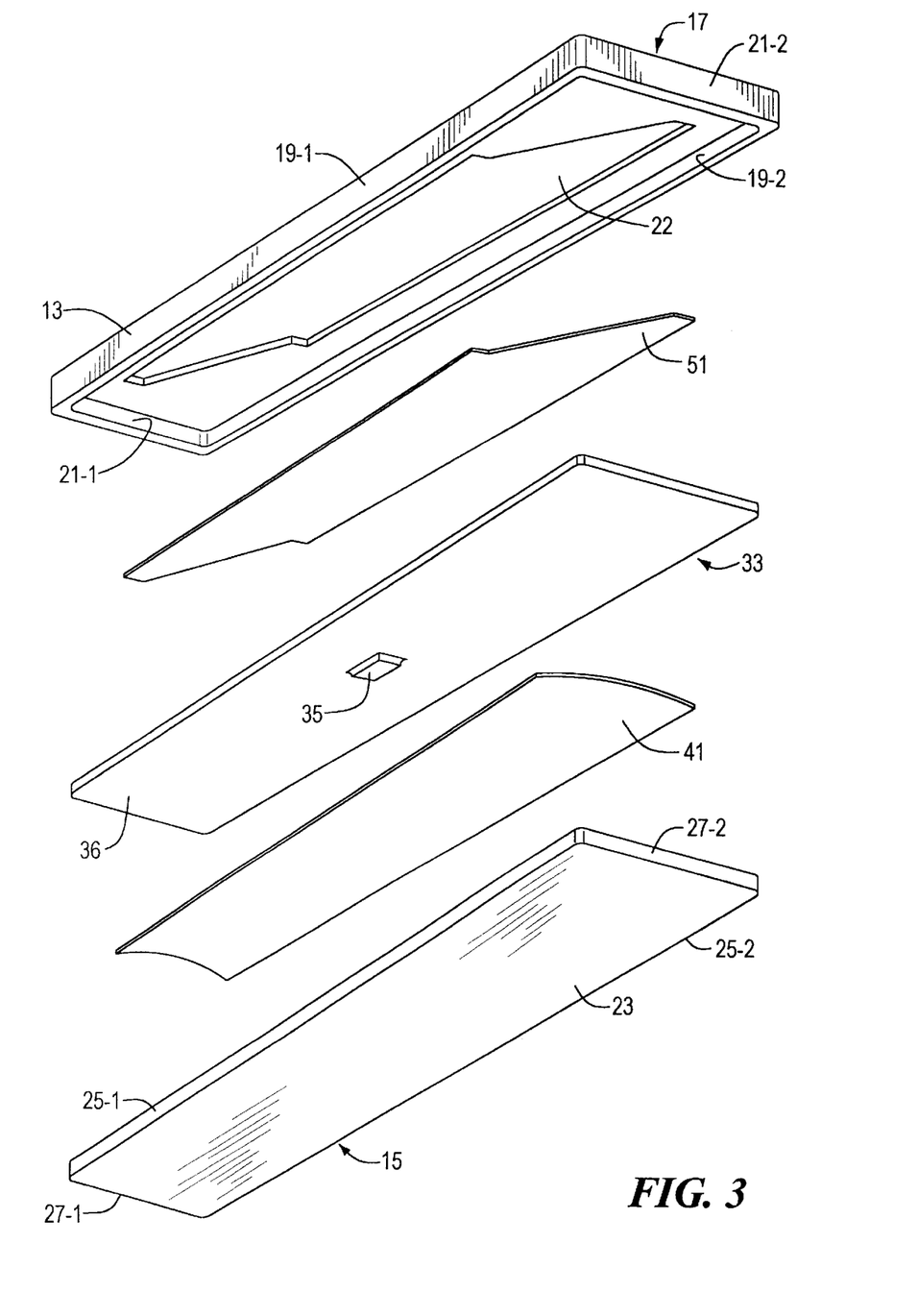
FIG. 3 is an exploded perspective view of the EAS marker of FIG. 1.

Referring now to FIGS. 1 through 3, there are shown various views of a first embodiment of an EAS marker constructed according to the teachings of the present invention, the EAS marker being represented generally by reference numeral 11.

Marker 11 comprises a top piece 13 and a bottom piece 15. Top piece 13, which is made of a rigid material, which may be, for example, polypropylene or a similar moldable synthetic material, is a generally rectangular, trough-shaped member having a top wall 17, a pair of side walls 19-1 and 19-2, a pair of end walls 21-1 and 21-2 and an open bottom. For reasons to become apparent below, top wall 17 is provided with a recessed area 22, recessed area 22 having a size, shape and depth complementary to that of a biasing magnet of the type used in EAS markers.

Figure 4:
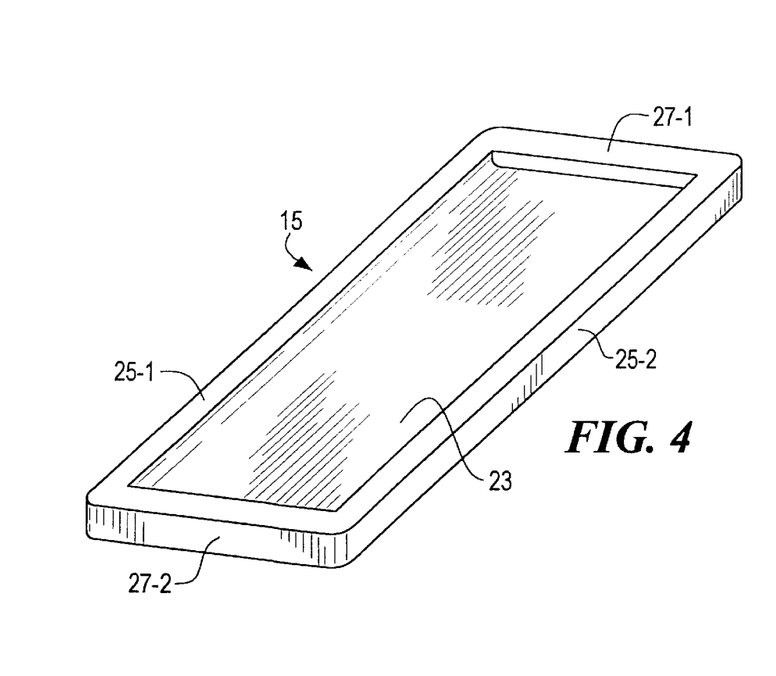
FIG. 4 is a front, top perspective view of the bottom piece of the EAS marker of FIG. 1.

Bottom piece 15 (see also FIG. 4), which is also made of a rigid material, which may be, for example, polypropylene or a similar moldable synthetic material, is a generally rectangular, trough-shaped member having a bottom wall 23, a pair of side walls 25-1 and 25-2, a pair of end walls 27-1 and 27-2 and an open top.

Bottom piece 15, which is disposed within top piece 13, is joined to top piece 13 by a press-fit, with side walls 25-1 and 25-2 of bottom piece 15 engaging side walls 19-1 and 19-2, respectively, of top piece 13 and end walls 27-1 and 27-2 of bottom piece 15 engaging end walls 21-1 and 21-2, respectively, of top piece 13. Instead of being press-fit together, top piece 13 and bottom piece 15 could be joined together by adhesive means, welding means or any other suitable chemical and/or mechanical means.

Figure 5:
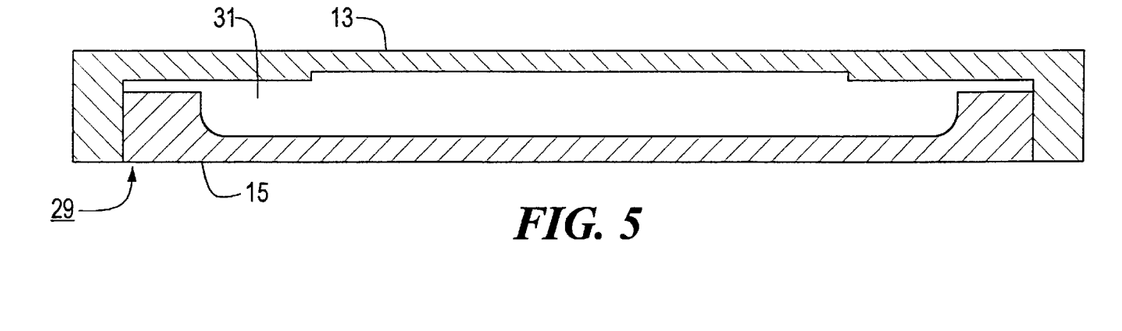
FIG. 5 is a section view of the top piece and the bottom piece of the EAS marker of FIG. 2 shown in an assembled form.

As seen best in FIG. 5, top piece 13 and bottom piece 15 together define a generally rectangular, closed housing 29 having a cavity 31. Because top piece 13 and bottom piece 15 are both made of a rigid material and because the remaining components of marker 11 (to be described below) are all disposed within cavity 31, one would expect marker 11 to exhibit good crush-resistance.

Referring back to FIGS. 2 and 3, marker 11 also comprises a separator 33. Separator 33, which is made of a rigid material, which may be, for example, polypropylene or a similar moldable synthetic material, is a generally rectangular member having a flat top surface 34. Although most of separator 33 is uniform in cross-sectional thickness, separator 33 includes a region of increased cross-sectional thickness in its midportion for reasons to be discussed below, said region forming a projection 35 extending downwardly relative to the remainder of the bottom surface 36 of separator 33.

Figure 6:
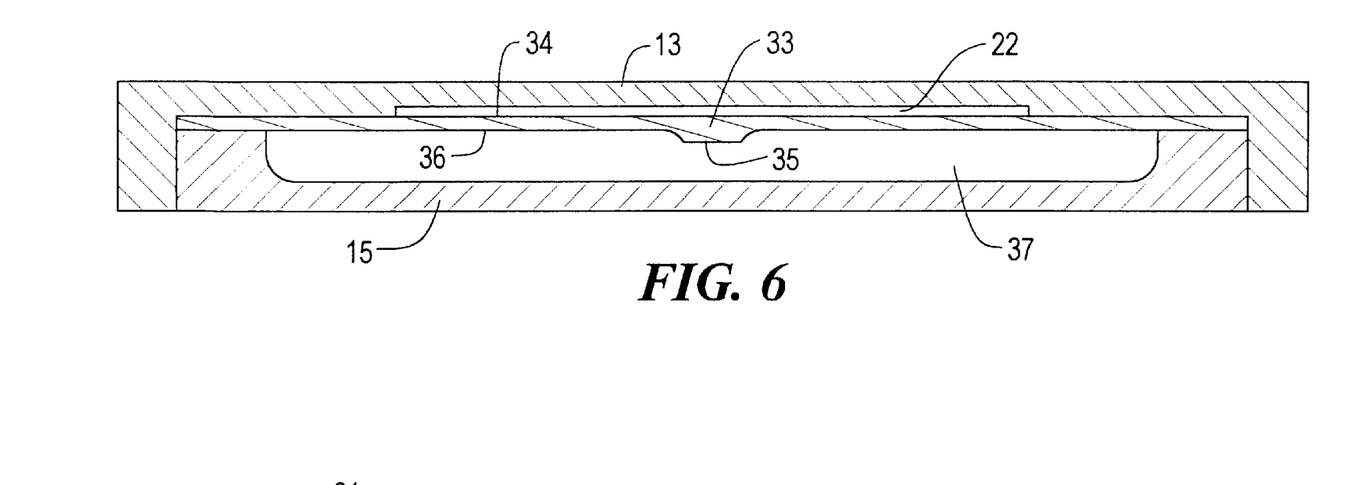
FIG. 6 is a section view of the top piece, the bottom piece and the separator of the EAS marker of FIG. 2 shown in an assembled form.

Separator 33, which is disposed within cavity 31 of housing 29, is press-fit against the interior surface of top wall 17 (except for recessed area 22). Instead of being press-fit together, separator 33 and top piece 13 could be joined together by adhesive means, welding means or any other suitable chemical and/or mechanical means. As seen best in FIGS. 2 and 6, with top piece 13, bottom piece 15 and separator 33 joined, the top surfaces of side wall 25-1, side wall 25-2, end wall 27-1 and end wall 27-2 of bottom piece 15 abut bottom surface 36 of separator 33. In this manner, separator 33 and bottom piece 15 together define a resonator cavity 37, with separator 33 physically separating resonator cavity 37 from recessed area 22 of top piece 13.

Marker 11 additionally comprises a resonator 41, resonator 41 being loosely encased within resonator cavity 37. Resonator 41 is preferably a strip of amorphous magnetostrictive ferromagnetic material of the type described, for example, in U.S. Pat. No. 4,510,489 and/or in U.S. Pat. No. 5,499,015 and/or is of the type conventionally used as a resonator in magnetostrictive EAS markers. For reasons to become apparent below, resonator 41 is preferably curved slightly about its longitudinal axis. Resonator 41 preferably has a length slightly shorter than that of resonator cavity 37.

Marker 11 further comprises a biasing element 51, biasing element 51 being disposed within recessed area 22 of top piece 13 and retained therein by separator 33. Biasing element 51 is preferably a flat strip of high coercivity material of the type that is reversibly magnetizable and that, when magnetized, causes resonator 41 to be mechanically resonant when exposed to an alternating electromagnetic field generated at a selected frequency by an EAS system. Biasing element 51 may be a material of the type described, for example, in U.S. Pat. No. 4,510,489 and/or in U.S. Pat. No. 5,499,015 and/or of the type conventionally used as a biasing element in magnetostrictive EAS markers.

Without wishing to limit the invention in any conceivable way to any particular embodiment of the invention, the present inventors hereby disclose the following preferred dimensions of certain components of marker 11: (1) Top piece 13 preferably has an exterior width $w_1$ of approximately 0.457 inch, an exterior height $h_1$ of approximately 0.050 inch, a top wall 17 thickness $t_1$ of approximately 0.010 inch (except in the area above area 22 where it is approximately 0.007 inch), a side wall/end wall thickness $t_2$ of approximately 0.032 inch; (2) Bottom piece 15 preferably has an exterior width $w_2$ of approximately 0.413 inch, an exterior height $h_2$ of approximately 0.026 inch, an interior width $w_3$ of approximately 0.273 inch, an interior height $h_3$ of approximately 0.020 inch, a bottom wall 23 thickness of approximately 0.008 inch and a side wall/end wall thickness $t_3$ of approximately 0.03 inch; (3) Separator 33 preferably has a thickness $t_4$ of approximately 0.002 inch, except in that portion including projection 35, which has a maximum thickness $t_5$ of approximately 0.010 inch; (4) Resonator 41 preferably has a thickness of approximately 0.001 inch; and (5) Biasing element 51 preferably has a thickness of approximately 0.003 inch.

Although not shown in the present embodiment, marker 11 could additionally include an adhesive layer, such as a double-sided adhesively-coated carrier sheet, applied to a suitable surface of housing 29, such as the bottom exterior surface of bottom piece 15, and could further include a peelable liner applied to the exposed surface of said carrier sheet.

Resonator 41 and biasing element 51 may be manufactured in the conventional manner. Each of top piece 13, bottom piece 15 and separator 33 is preferably made of a synthetic moldable material and is preferably manufactured by molding. As will be described below in greater detail, the preferred molding technique for making each of top piece 13, bottom piece 15 and separator is rotary extrusion molding, examples of which are described in U.S. Pat. No. 4,462,784, inventor Russell, issued Jul. 31, 1984 and in U.S. Pat. No. 3,515,778, inventors Fields et al., issued Jun. 2, 1970, both of which are incorporated herein by reference, and in commonly-assigned, presently-pending U.S. patent application Ser. Nos. 08/925,117 and 08/867,348.

Figure 7:
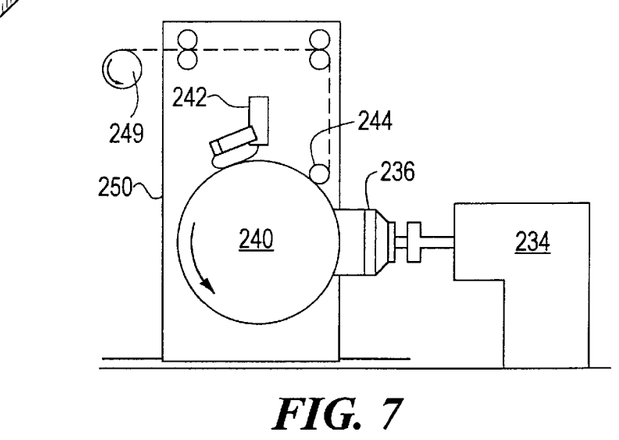
FIG. 7 is a schematic elevational view of a continuous molding apparatus in accordance with U.S. Pat. No. 4,462,784.

With reference to the molding apparatus 250 of FIG. 7, a cooled molding wheel 240 is mounted for rotation around its axis and includes mold cavities (not shown) about its periphery. The cavities are complementary in shape to the parts to be molded (e.g., a web of top pieces 13). Extrusion manifold 236 has an arcuate surface substantially complementary to a portion of the peripheral mold surface. Manifold 236 has an orifice spaced from the mold cavities, and molten plastic from extruder 234 fills the mold cavities and forms over them a film of predetermined thickness. Knife assembly 242 skives away excess plastic. The web of molded parts is removed from the molding wheel at 244 and wound onto a roller at 249. Thus, where top piece 13, bottom piece 15 and/or separator 33 is made by rotary extrusion molding, the molded product is typically a continuous web comprising a plurality of units of the item molded. A preferred method and apparatus for assembling marker 11 from a plurality of continuous webs comprising pluralities of top pieces 13, bottom pieces 15 and separators 33 is described below in connection with FIG. 9.

However, regardless of the particular technique used to manufacture top piece 13, bottom piece 15 and separator 33, marker 11 will preferably be assembled according to the following precepts: top piece 13 is inverted and biasing element is inserted into area 22. Separator 33 is then inserted into and joined to top piece 13 in the manner described above, thereby encasing biasing element 51 within area 22. Top piece 13, separator 33 and biasing element 51 thus form a first sub-assembly of marker 11. Independently of the aforementioned assembly of said first sub-assembly, resonator 41 is inserted into bottom piece 15, thus forming the second sub-assembly of marker 11. It is to be noted that resonator 41 is preferably oriented within piece 15 such that it curves slightly downwardly about its longitudinal axis. The above-described first and second sub-assemblies are then joined to yield marker 11 by once again inverting top piece 13 to its proper orientation and fully inserting bottom piece 15 into top piece 13.

Marker 11 is intended to be used in the same fashion as conventional magnetomechanical EAS markers. Accordingly, so long as biasing element 51 is in a magnetized state, resonator 41 will resonate at a desired frequency when subjected to an alternating electromagnetic field at said frequency. Therefore, marker 11 can be applied to articles of merchandise and armed appropriately so that it will send a detectable signal to an EAS system unless disarmed before the article is brought into the interrogation zone of the EAS system.

As can readily be appreciated, in general, a magnetomechanical EAS marker will not function properly if its resonator is not permitted to resonate freely, due to mechanical impedance. Because the biasing element and the resonator of a magnetomechanical EAS marker typically exhibit a magnetic attraction for one another, if left physically unseparated, the resonator and the biasing element will often come together, thereby dampening the resonance of the resonator due to contact between the biasing element and the resonator. Moreover, even if the resonator and the biasing element are separated by some separating member, the magnetic attraction between the resonator and biasing element often results in the resonator being drawn against the separating member or in contact with a member of the marker housing, once again causing a dampening of the resonance of the resonator.

One way to lessen the magnetic attraction between the resonator and the biasing member is to increase the spacing therebetween. However, if the biasing member and the resonator are positioned too far apart, the biasing member will not provide the resonator with a strong enough magnetic field to arm the resonator for resonance when subjected to an interrogation signal. The present inventors believe that separator 33 addresses the above-described problems as follows: (1) Separator 33 is shaped to include a projection 35 that extends downwardly beyond the remainder of bottom surface 36 of separator 33. Projection 35 is preferably sized and shaped to contact the top of resonator 41 only within the node or non-vibrating part of resonator 41—the node typically being a circular area approximately 0.1 inch in diameter located in approximately the middle of resonator 41. This minimizes contact between separator 33 and resonator 41 (particularly at the ends of resonator 41, which must be free to resonate) and, therefore, is believed to minimize the resonance dampening of resonator 41. (2) Projection 35 is also preferably sized so that resonator 41 and biasing element 51 are separated, at the point of contact between separator 33 and resonator 41, by a distance that strikes a balance between (i) the desired effect of having the biasing element provide a sufficiently strong magnetic field to arm the resonator and (ii) the undesired effect of having the biasing element pull the resonator towards itself through magnetic attraction. In the present embodiment, a separation of approximately 0.010 inch between the resonator and the biasing element is preferred although it should be understood that the particulars of the materials used as the resonator and the biasing element may influence the preferred separation distance. As can readily be appreciated, because separator 33 (as well as top piece 13 and bottom piece 15) is preferably made of molded plastic, the dimensions of projection 35 can be carefully controlled and the aforementioned approximately 0.010 inch separation between resonator 41 and biasing element 51 can be reproducibly achieved with minimal variability.

Figure 8:
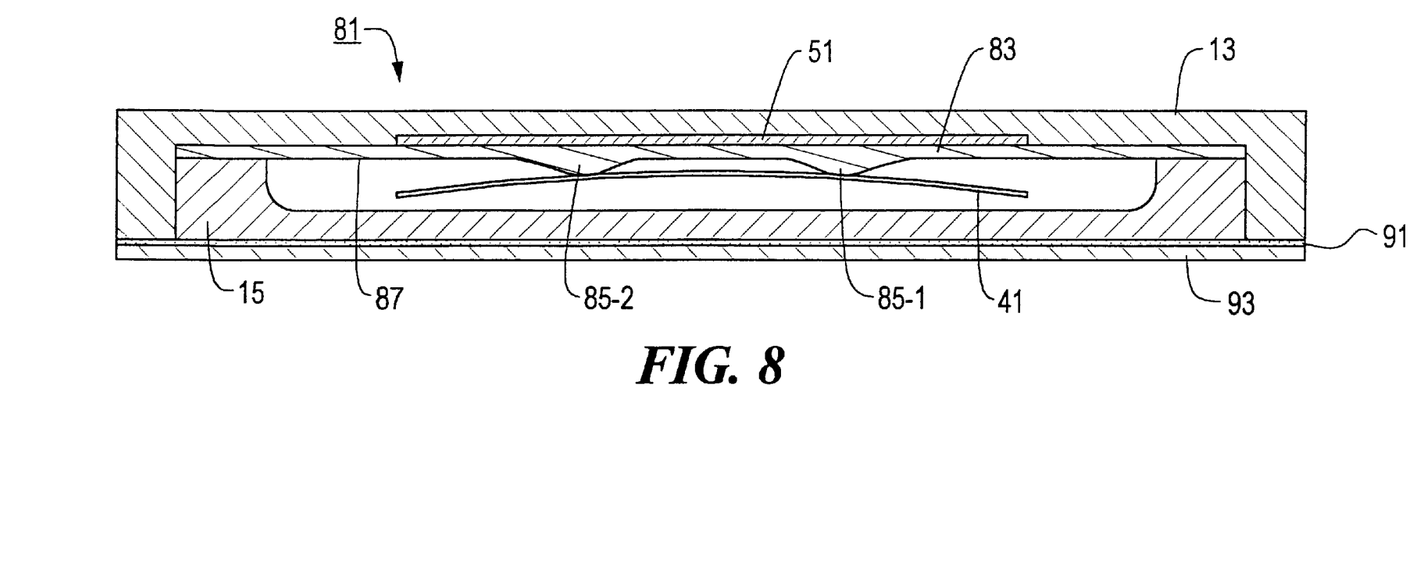
FIG. 8 is a section view of a second embodiment of an EAS marker constructed according to the teachings of the present invention.

Referring now to FIG. 8, there is shown a section view of a second embodiment of an EAS marker constructed according to the teachings of the present invention, said EAS marker being represented generally by reference numeral 81.

Marker 81 is substantially similar to marker 11, one difference between the two markers being that marker 81 includes a separator 83 having a pair of projections 85-1 and 85-2 that extend downwardly beyond the bottom surface 87 of separator 81 and that are sized and shaped to engage the top of resonator 41 within the above-described circular area approximately 0.1 inch in diameter located in approximately the middle of resonator 41. Projections 85-1 and 85-2 are appropriately sized so that the distance between biasing element 51 and the points of contact between projections 85-1 and 85-2 and resonator 41 is approximately 0.010 inch.

Marker 81 is additionally distinguishable from marker 11 in that marker 81 further comprises an adhesive 91 applied to the exterior surface of bottom wall 23 and a peelable liner 93 applied to the bottom of adhesive 91. Adhesive 91 may be, for example, a double-sided adhesive tape or an adhesive composition applied directly to bottom wall 23.

It is to be understood that, although separator 83 is provided with two projections 85-1 and 85-2, other embodiments of the separator of the present invention could be provided with three or more such projections, wherein the precise number of projections could be based upon a desired mechanical effect wished to be imposed upon the resonator by the separator.

It is also to be understood that, in other embodiments of the marker of the present invention, the biasing element could be eliminated from the marker and made a part of the EAS system or could be incorporated into or printed onto the marker housing; alternatively, the resonator could be a self-biasing resonator of the type described in U.S. Pat. No. 5,565,849, thereby obviating the need for a biasing element altogether. Moreover, it is also contemplated that the marker housing of the present invention could alternatively be used to house components of EAS markers other than of the magnetomechanical variety or that at least a portion of the marker housing could be integrally formed with an article of merchandise.

Still in another embodiment of the invention (not shown), the separator is eliminated from the marker, the biasing element is incorporated into top piece 13, and top piece 13 is shaped to include one or more projections functioning equivalently to projection 35 or projections 85-1 and 85-2.

Figure 9:
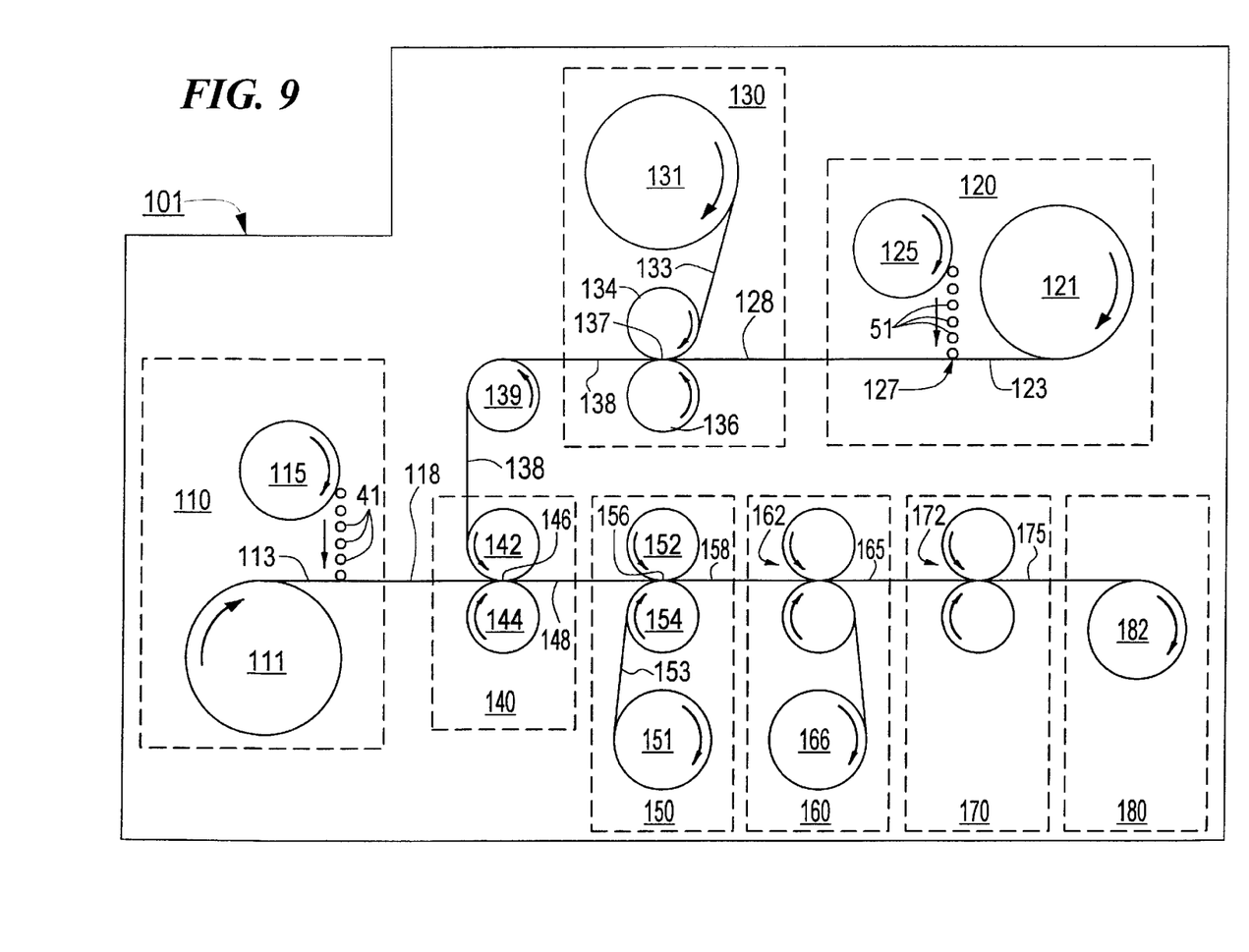
FIG. 9 is a simplified schematic view of an automated apparatus for manufacturing the EAS marker of FIG. 8.

Referring now to FIG. 9, there is shown a simplified schematic view of one embodiment of an automated apparatus for manufacturing marker 81 using master rolls, the apparatus being constructed according to the teachings of the present invention and being represented generally by reference numeral 101.

Apparatus 101 includes a resonator station 110. Station 110, in turn, includes a roller 111 for automatically and continuously feeding a master roll 113 containing an array of bottom pieces 15 for marker 81 (the individual bottom pieces 15 of master roll 113 not being visible in FIG. 9). Master roll 113 is preferably, but not necessarily, made by rotary extrusion molding and may be manufactured either in-line or off-line with roller 111. Although not shown, roll 113 preferably includes locator means, such as registration markings, to ensure the precise registration of master roll 113 with other components to be described below.

Station 110 also includes means 115 for precisely and automatically dispensing a resonator 41 (resonator 41 being depicted schematically in FIG. 9) into each of the bottom pieces 15 of master roll 113 at a resonator inserting location 117 to form a marker subassembly 118. The manufacture (see e.g., U.S. Pat. Nos. 4,510,489 and 4,510,490) and/or other preliminary processing (e.g., annealing, cutting, testing) of resonators 41 may be performed in-line or off-line with the dispensing thereof into bottom pieces 15.

Apparatus 101 also includes a bias station 120. Station 120, in turn, includes a roller 121 for automatically and continuously feeding a master roll 123 containing an array of top pieces 13 for marker 81 (the individual top pieces 13 of master roll 123 not being visible in FIG. 9). Master roll 123 is preferably, but not necessarily, made by rotary extrusion molding and may be manufactured either in-line or off-line with roller 121. Although not shown, roll 123 preferably includes locator means, such as registration markings, to ensure the precise registration of master roll 123 with other components to be described below.

Station 120 also includes means 125 for precisely and automatically dispensing a biasing element 51 (biasing element 51 being depicted schematically in FIG. 9) into the recessed area 22 of each of the top pieces 13 of master roll 123 at a biasing element inserting location 127 to form an assembly 128. In order to retain biasing element 51 in recessed area 22, master roll 123 is oriented so that the top pieces 13 thereof are inverted. The manufacture (see e.g., U.S. Pat. Nos. 4,510,489 and 4,510,490) and/or other preliminary processing (e.g., cutting, stacking, or otherwise arraying) of biasing elements 51 may be performed in-line or off-line with the dispensing thereof into top pieces 13. As can readily be appreciated, the complementary shape of recessed area 22 to biasing element 51 assists in the precise placement of biasing element 51 in top piece 13, both at the time of insertion of element 51 into piece 13 and in the finished marker.

Apparatus 101 additionally includes a separator station 130. Station 130, in turn, includes a roller 131 for automatically and continuously feeding a master roll 133 containing an array of separators 83 for marker 81 (the individual separators 83 of master roll 133 not being visible in FIG. 9). Master roll 133 is preferably, but not necessarily, made by rotary extrusion molding and may be manufactured either in-line or off-line with roller 131. Although not shown, roll 133 preferably includes locator means, such as registration markings, to ensure the precise registration of master roll 133 with other components to be described below.

Station 130 additionally includes a pair of rollers 134 and 136. Assembly 128 and master roll 133 are automatically fed between rollers 134 and 136 whereupon separators 83 of master roll 133 are automatically press-fit into the cavities of top pieces 13 of master roll 123 at the nip 137 between rollers 134 and 136 to form a marker subassembly 138. As can readily be appreciated, separators 83 of master roll 133 must be precisely registered with top pieces 13 of master roll 123. Once a separator 83 has been press-fit into its corresponding top piece 13, the biasing element 51 disposed in recessed area 22 is securely retained therein by separator 83.

Apparatus 101 additionally comprises a roller 139 for inverting marker subassembly 138 comprising master rolls 123 and 133 and biasing elements 51 emergent from station 130.

Apparatus 101 further comprises a marker assembly station 140, station 140, in turn, comprising a pair of rollers 142 and 144. Marker subassemblies 118 and 138 are automatically fed between rollers 142 and 144 whereupon subassemblies 118 and 138 are automatically laminated to each other at nip 146, i.e., bottom pieces 15 of subassembly 118 are press fit into top pieces 13 of subassembly 138, to form marker subassembly 148.

Apparatus 101 further comprises an adhesion lamination station 150. Station 150, in turn, includes a roller 151 for automatically and continuously feeding a master roll 153 containing a pressure-sensitive-adhesive-coated liner (the details of master roll 153 not being visible in FIG. 9). Master roll 153 may be made in the conventional manner and may be manufactured either in-line or off-line with roller 151. Station 150 also comprises a pair of rollers 152 and 154. Marker subassembly 148 and master roll 153 are automatically fed between rollers 152 and 154 whereupon subassembly 148 and master roll 153 are automatically laminated to each other at nip 156 to form marker stock 158.

Apparatus 101 further comprises a die cutting station 160. Station 160 comprises rotary die cutting means 162 for cutting marker stock 158 into markers 165 and for stripping off the surrounding marker matrix, which is taken up by roller 166.

Apparatus 101 further comprises a slitting station 170. Station 170 comprises rotary means 172 for slitting the array of die cut markers 165 into individual rolls of markers 175.

Apparatus 101 further comprises a rewind station 180, station 180 comprises a roller 182 around which markers 175 are wound or coiled for storage and/or shipment.

Thus, it will be seen that the master roll assembly process of the present invention allows the precise in-line assembly of complex electromechanical devices, or other precisely assembled devices, and the conversion of these devices into pressure sensitive roll labels using conventional roll lamination equipment and processes.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An EAS marker comprising:

(a) a first trough-shaped member;

(b) a second trough-shaped member, said second trough-shaped member being joined to said first trough-shaped member to form a closed housing defining a cavity; and (c) means disposed within said cavity for emitting a response signal in response to an interrogation signal transmitted by an EAS system, said response signal emitting means comprising a strip of magnetostrictive material.

2. The EAS marker as claimed in claim 1 wherein each of said first and second trough-shaped members is made of a rigid material.

3. The EAS marker as claimed in claim 2 wherein each of said first and second trough-shaped members is made of molded plastic.

4. The EAS marker as claimed in claim 1 wherein said first trough-shaped member includes a top wall, a pair of side walls, a pair of end walls and an open bottom and wherein said second trough-shaped member includes a bottom wall, a pair of side walls, a pair of end walls and an open top, said second trough-shaped member being inserted into and secured to the inside of said first trough-shaped member.

5. The EAS marker as claimed in claim 4 wherein said first and second trough-shaped members are press-fit together.

6. An EAS marker comprising:

(a) a first trough-shaped member;

(b) a second trough-shaped member, said second trough-shaped member being joined to said first trough-shaped member to form a closed housing defining a cavity;

(c) means disposed within said cavity for emitting a response signal in response to an interrogation signal transmitted by an EAS system, said response signal emitting means comprising a resonator; and (d) a biasing element, said biasing element being positioned relative to said resonator so that, when said biasing element is magnetized, said resonator is armed.

7. The EAS marker as claimed in claim 6 wherein said biasing element is disposed within said cavity.

8. The EAS marker as claimed in claim 7 further comprising a separator disposed within said cavity between said resonator and said biasing element for physically separating said biasing element and said resonator.

9. The EAS marker as claimed in claim 8 wherein said biasing element and said resonator are spaced apart by said separator to a distance of approximately 0.010 inch.

10. An EAS marker comprising:

(a) a housing comprising a first piece and a second piece matingly secured to one another and press-fit together, said first piece and said second piece defining a cavity therebetween;

(b) a resonator disposed within said cavity; and (c) a biasing element, disposed within said cavity, for arming said resonator.

11. An EAS marker comprising:

(a) a generally rectangular, closed housing made of a rigid material, said generally rectangular, closed housing having a cavity;

(b) a resonator disposed within said cavity; and (c) a biasing element, disposed within said cavity and over said resonator, for arming said resonator.

12. The EAS marker as claimed in claim 11 further comprising a separator disposed within said cavity for physically separating said resonator and said biasing element, said separator being disposed between said resonator and said biasing element.

13. The EAS marker as claimed in claim 12 wherein said separator is a rigid member.

14. An EAS marker comprising:

(a) a resonator container, said resonator container having a cavity and an open top;

(b) a resonator disposed within said cavity of said resonator container;

(c) a separator positioned over said open top of said resonator container;

(d) a biasing element disposed on top of said separator for arming said resonator; and (e) a cover, said cover having a chamber and open bottom, said resonator container, said separator and said biasing element being disposed within said chamber and secured to said cover.

15. The EAS marker as claimed in claim 14 wherein said cover has a recessed area in which said biasing element is situated.

16. The EAS marker as claimed in claim 15 wherein said recessed area has dimensions complementary to that of said biasing element.

17. The EAS marker as claimed in claim 16 wherein said separator and said resonator container are joined to said cover by a press-fit.

18. The EAS marker as claimed in claim 14 wherein one or more of said resonator container, said separator and said cover is made of a rigid material.

19. The EAS marker as claimed in claim 14 wherein one or more of said resonator container, said separator and said cover is made of a rigid molded plastic.

20. The EAS marker as claimed in claim 14 wherein each of said resonator container, said separator and said cover is made of a rigid molded plastic.

21. An EAS marker comprising:

(a) a housing, said housing having a cavity;

(b) a resonator disposed within said cavity;

(c) a biasing element disposed within said cavity for arming said resonator; and (d) a separator positioned within said cavity between said resonator and said biasing element for physically separating said resonator and said biasing element, said separator being made of a rigid material and having a non-uniform cross-sectional thickness.

22. The EAS marker as claimed in claim 21 wherein said separator is made of molded plastic.

23. An EAS marker comprising:

(a) a housing, said housing having a cavity;

(b) a resonator disposed within said cavity;

(c) a biasing element disposed within said cavity for arming said resonator; and (d) a separator positioned within said cavity between said resonator and said biasing element for physically separating said resonator and said biasing element, said separator being made of a rigid material, said biasing element being disposed on top of said separator, said separator being positioned over said resonator.

24. The EAS marker as claimed in claim 23 wherein said separator has a top surface and a bottom surface, said top surface being flat, said bottom surface being shaped to include a projection extending downwardly for a distance beyond the remainder of said bottom surface.

25. The EAS marker as claimed in claim 24 wherein the distance between said top surface of said separator and the bottom of said projection is approximately 0.010 inch.

26. The EAS marker as claimed in claim 24 wherein said bottom surface is shaped to include at least two projections extending downwardly for a distance beyond the remainder of said bottom surface.

27. The EAS marker as claimed in claim 24 wherein said resonator has a non-vibrating node and wherein said projection is dimensioned and positioned relative to said resonator to contact said resonator only at said node.

28. An EAS marker comprising:
   (a) a resonator container, said resonator container having a cavity and an open top;
   (b) a resonator disposed within said cavity of said resonator container;
   (c) a separator positioned over said open top of said resonator container, said separator having a non-uniform cross-sectional thickness; and
   (d) a biasing element disposed on top of said separator for arming said resonator.

29. The EAS marker as claimed in claim 28 further comprising a cover, said cover being secured to said separator and encasing said biasing element therebetween.

30. The EAS marker as claimed in claim 28 wherein said separator is made of molded plastic.

31. The EAS marker as claimed in claim 28 wherein said separator has a top surface and a bottom surface, said top surface being flat, said bottom surface being shaped to include a projection extending downwardly for a distance beyond the remainder of said bottom surface.

32. The EAS marker as claimed in claim 31 wherein the distance between said top surface of said separator and the bottom of said projection is approximately 0.010 inch.

33. The EAS marker as claimed in claim 31 wherein said bottom surface is shaped to include at least two projections extending downwardly for a distance beyond the remainder of said bottom surface.

34. The EAS marker as claimed in claim 31 wherein said resonator has a non-vibrating node and wherein said projection is dimensioned and positioned relative to said resonator to contact said resonator only at said node.

35. An EAS marker comprising:
   (a) a resonator container, said resonator container having a cavity and an open top;
   (b) a resonator disposed within said cavity of said resonator container;
   (c) a separator positioned over said open top of said resonator container, said separator being made of a rigid material and being shaped to define at least one downwardly-extending projection; and
   (d) a biasing element disposed on top of said separator for arming said resonator.

36. The EAS marker as claimed in claim 35 wherein said separator is shaped to define at least two downwardly-extending projections.

37. An EAS marker comprising:
   (a) a housing, said housing having a cavity and a top wall, said top wall having a recessed area facing said cavity;
   (b) a resonator disposed within said cavity;
   (c) a biasing element for arming said resonator, said biasing element being positioned within said recessed area; and
   (d) a separator disposed within said cavity between said resonator and said biasing element for physically separating said resonator and said biasing element, said separator retaining said biasing element in said recessed area.

38. The EAS marker as claimed in claim 37 wherein said recessed area has dimensions complementary to said biasing element.

39. The EAS marker as claimed in claim 37 wherein said separator is secured to said top wall of said housing.

40. The EAS marker as claimed in claim 39 wherein said separator is press-fit against said top wall of said housing.

41. An EAS marker comprising:
   (a) a first molded member made of a rigid plastic, said first molded member being generally rectangular and having a bottom wall, a pair of side walls, a pair of end walls and an open top;
   (b) a second molded member made of a rigid plastic, said second molded member being generally rectangular and having a top wall, a pair of side walls, a pair of end walls and an open bottom, said top wall having a recessed area;
   (c) a third molded member made of a rigid plastic, said third molded member having a flat top surface, a non-uniform cross-sectional thickness, and a bottom surface shaped to include a projection extending downwardly for a distance beyond the remainder of said bottom surface, the distance between said top surface of said third molded member and the bottom of said projection being approximately 0.010 inch;
   (d) said third molded member being secured within said second molded member, with said top surface of said third molded member being press-fit against the interior surface of said top wall of said second molded member;
   (e) said first molded member being secured within said second molded member, with said side walls and said end walls of said first molded member being press-fit against the interior surfaces of said side walls and said end walls of said second molded member and against the bottom surface of said third molded member;
   (f) said first and third molded members defining a resonator cavity;
   (g) a resonator, said resonator being disposed within said resonator cavity, said resonator being bowed downwardly about its longitudinal axis, said resonator having a non-vibration node;
   (h) said projection of said third molded member being aligned with and dimensioned to contact only said non-vibration node of said resonator;
   (i) a biasing element for arming said resonator, said biasing element being disposed within said recessed area of said second molded member.

42. The EAS marker as claimed in claim 41 wherein said recessed area of said second molded member has dimensions complementary to that of said biasing member.

43. The EAS marker as claimed in claim 42 further comprising an adhesive applied to the exterior surface of at least one of said second molded member and the bottom wall of said first molded member.

44. The EAS marker as claimed in claim 43 further comprising a peelable liner applied to said adhesive.

45. The EAS marker as claimed in claim 44 wherein said adhesive is disposed on the exterior surface of the bottom wall of said second molded member.

* * * * *